Patented Jan. 6, 1948

2,434,197

UNITED STATES PATENT OFFICE 2,434,197

PROCESS FOR PRETREATING PINENE CRUDES

Edwin L. Cline, Philadelphia, Pa., assignor to Allied Chemical & Dye Corporation, New York, N. Y., a corporation of New York No Drawing. Application April 13, 1943,
Serial No. 482,885

4 Claims. (Cl. 260—675.5)

This invention relates to the treatment of resin crudes containing pinene so as to produce oils capable of yielding improved resin products on polymerization.

It is an object of this invention to provide an improved method for treating resin crudes containing pinene so that a greatly improved resin product may be obtained from the resulting purified resin crude.

In accordance with this invention dark-resin-forming constituents and other undesirable components are removed from a resin crude containing pinene by contacting the crude with an amount of acid-activated natural clay not greater than 5% of the weight of the crude at temperatures between about 0° and about 60° C. for a time between about one and about six hours. By operating under such conditions substantially all of the dark-resin-forming constituents and other undesirable components are removed without, however, effecting substantial polymerization of the pinene constituents of the crude; failure to observe the above conditions, I have found, leads either to insufficient removal of the undesirable components from the crude, or to substantial polymerization of the desirable pinene constituents of the crude. The purification step of my invention results in the production of a purified resin oil which may be recovered from the purified crude by distillation and subjected to polymerization conditions in any suitable manner to produce a substantially colorless and odorless resin, and a dark resinous material resulting from selective polymerization of the dark-resin-forming constituents of the crude and which remains as residue upon distillation of the purified crude and may be advantageously employed as a plasticizer.

As hereinabove pointed out, this invention is applicable to the treatment of any resin crude containing pinene. It is particularly applicable to sulfate turpentine since this resin crude contains between about 50% and about 90% pinene and is cheap and readily available. The resin crudes, if necessary, may be fractionated prior to treatment by my invention in order to recover a narrow-boiling fraction containing increased amounts of the polymerizable constituents. When it is desired to work with a particularly impure crude oil fraction, the crude fraction may be subjected to suitable preliminary purification treatment, such as redistillation or chemical treatment, e. g., sulfuric acid treatment, to remove impurities before carrying out the purification treatment of my invention. In this connection it should be appreciated that the presence of as much as 0.01% color-forming impurities is sufficient to impart objectionable color to the resin subsequently obtained from the crude so that the removal of such impurities is of the utmost importance.

The activated clay employed for the pre-polymerization of the crude in accordance with my invention is a natural clay such as fuller's earth which has been subjected to acid treatment, e. g., treatment with sulfuric acid, then washed, or neutralized and washed, to remove all or substantially all of the treating acid, and thereafter dried. An example of an activated clay which may be used in my process is the product sold commercially as "Super-Filtrol," which is a neutral acid-activated natural clay.

In carrying out the process of my invention the resin crude in the liquid phase is maintained in contact with an amount of the acid-activated clay not greater than about 5%, and preferably between about 2% and about 4%, of the weight of the crude. Contact of the crude with the clay may be accomplished, for example, by suspending the clay in the crude and agitating the mixture, or by flowing the crude through a bed of activated clay. The temperature at which contact of the crude and clay is carried out should be between about 0° and about 60° C., preferably between about 0° and about 30° C., and the time of treatment between about one and about six hours, preferably between about one and about three hours, in order to achieve substantially complete removal of the undesirable constituents of the resin crude in accordance with this invention. It is desirable to carry out the pretreatment in the absence of air, for example, in an atmosphere of carbon dioxide. This pretreatment usually effects polymerization of between about 5% and about 50% of the available resin-forming constituents of the crude.

On termination of the above treatment the clay may be separated from the oil and the oil then distilled, preferably by vacuum or steam distillation, to produce a refined resin oil as distillate and a dark, soft resin product as residue; the resin may be used as a plasticizer or for other purposes. The distillate may then be subjected to polymerization, for example by subjecting it to the action of aluminum chloride, whereby a substantially colorless and odorless resin is obtained.

Treatment of resin crudes containing pinene in accordance with my invention, I have found, in all cases results in the production of a resin of improved color and odor even when a highly colored or odoriferous resin crude is treated. Even in cases where a substantially colorless and odorles resin crude is processed, improved results are also obtained. For example, a colorless turpentine yields a resin of yellow shade when polymerized with anhydrous aluminum chloride in the customary manner but after treatment of the turpentine in accordance with this invention polymerization of the purified distillate with the same amount of aluminum chloride yields a substantially colorless product. Therefore, it will be evident that the process of my invention not only removes color-forming bodies, but also effects the removal of undesirable materials which upon polymerization may tend to otherwise adversely affect the properties of the resin.

The following example is illustrative of my invention. Amounts are given in parts by weight.

200 parts of sulfate turpentine having a boiling range between 155° and 168° C. and containing about 70% alpha-pinene and 15% beta-pinene were stirred with 5 parts of dry "Super-Filtrol" for one hour at 0° C. At the end of this time the clay was separated and the oil was steam distilled at a still temperature of 150° C.; a soft, dark resin remained as still residue. The distillate was separated from the water and diluted with an equal amount of toluene; 10 parts of anhydrous aluminum chloride were then added with agitation to the solution of the distillate in toluene and the mixture stirred for one hour after addition of aluminum chloride was completed, the temperature being maintained at 0° C. during this time. At the end of this time the oil-catalyst suspension was permitted to settle, the oil was decanted from the catalyst and stirred for fifteen minutes with alcoholic ammonium hydroxide solution. The precipitated catalyst was permitted to settle and the clear polymerized oil was recovered by filtration. The resin contained in the oil was recovered by steam distillation, whereby a substantially colorless product having a melting point of 131° C. was obtained. Polymerization of sulfate turpentine in the same manner, without, however, employing the preliminary clay treatment, yielded a resin of substantially inferior color.

Since certain changes may be made in carrying out the above process without departing from the scope of the invention, it is intended that all matter contained in the above description shall be interpreted as illustrative and not in a limiting sense.

I claim:

1. A process for removing dark-resin-forming constituents and other undesirable components from a resin crude containing pinene, which comprises subjecting the crude to contact with an acid-activated natural clay in an amount not greater than 5% of the weight of the crude at a temperature between about 0° and about 60° C., and separating a resinous material resulting from polymerization of the dark-resin-forming constituents of the crude from the remainder of the crude.

2. A process for removing dark-resin-forming constituents and other undesirable components from a resin crude containing pinene, which comprises subjecting the crude to contact with an acid-activated natural clay in an amount not greater than 5% of the weight of the crude at a temperature between about 0° and about 60° C. and for a time between about one and about six hours, and separating a resinous material resulting from polymerization of the dark-resin-forming constituents of the crude from the remainder of the crude.

3. A process for removing dark-resin-forming constituents and other undesirable components from a resin crude containing pinene, which comprises subjecting the crude to contact with an acid-activated natural clay in an amount between about 2% and about 4% of the weight of the crude at a temperature between about 0° and about 30° C. and for a time between about one and about three hours, and then distilling the crude to separate as residue resinous material resulting from polymerization of the dark-resin-forming constituents of the crude.

4. A process for removing dark-resin-forming constituents and other undesirable components from turpentine which comprises subjecting the turpentine to contact with an acid-activated natural clay in an amount between about 2% and about 4% of the weight of the turpentine at a temperature between about 0° and about 30° C. and for a time between about one and about three hours, and steam distilling the turpentine to separate as residue a resinous material resulting from polymerization of the dark-resin-forming constituents of the turpentine.

EDWIN L. CLINE.

REFERENCES CITED

The following references are of record in the file of this patent:

UNITED STATES PATENTS

| Number | Name | Date |
| --- | --- | --- |
| 1,831,105 | Fairley | Nov. 10, 1931 |
| 1,939,932 | Thomas | Dec. 19, 1933 |
| 2,264,774 | Sheehan | Dec. 2, 1941 |
| 2,335,912 | Burroughs | Dec. 7, 1943 |
| 2,354,775 | Rummelsburg | Aug. 1, 1944 |
| 2,358,855 | Etzel | Sept. 26, 1944 |

OTHER REFERENCES

Morrell, "Synthetic Resins and Allied Plastics," page 252, Oxford Press. (Copy in Division 50.)